3,778,425
PROCESS FOR THE MANUFACTURE OF GRANULAR OR POWDERY PURIFIED WHOLE EGG PROTEIN
Makoto Kandatsu and Michio Yamaguchi, Tokyo, Japan, assignors to Tokyo Daigaku, Tokyo, Japan
No Drawing. Filed Oct. 30, 1968, Ser. No. 771,987
Claims priority, application Japan, Oct. 31, 1967, 42/70,091
Int. Cl. A23j *1/08*
U.S. Cl. 260—112 R                     9 Claims

ABSTRACT OF THE DISCLOSURE

A process for producing a purified protein substance obtained from whole eggs by heating a mixture of an alcohol and eggs to dehydrate and defat the eggs and form coagulated protein particles which are then contacted with hot water to remove carbohydrates and inorganic salts, whereafter the water is removed by contact with an organic, dehydrating, solvent and any remaining fat is removed by contact with an organic defatting solvent. The resulting protein substance is dried to form a granular product which may then be crushed to powder form. The product is useful as a protein source in foods, or as an animal feed, or as a food supplement.

BRIEF SUMMARY OF THE INVENTION

This invention relates to a process for the manufacture of a high-preservative granular or powdery purified whole egg protein substance, in which process the whole egg protein substance contained in the yolk and white of the raw material of an egg can be easily extracted from the egg, in a high purity, without degrading the nutritive value of the raw material protein substance.

The process of the invention is characterized in that the egg removed from the shell is mixed with a hydrophilic defatting solvent such as ethanol, methanol, acetone and the like and after the mixture is heated, while stirred, the majority of fat and moisture thereof is removed and at the same time the protein substance is formed into small coagulated pieces, whereafter the resultant defatted and dehydrated, coagulated, protein is filtered and subjected to a hot water treatment for removal of carbohydrates and inorganic salts, then to a subsequent water removal treatment with an organic dehydrating solvent or by drying, and thereafter to a final fat removal treatment with a defatting solvent such as ether, hexane, etc., whereupon the resultant, purified, coagulated protein substance is dried in granular form, and, if necessary, is then crushed to powder form.

DETAILED DESCRIPTION 43 raw hen's eggs (2500 g. raw material) obtained from the market were broken and put in a vessel and beaten so that the yolk and the white were thoroughly mixed. To the mixture was added 3 l. of ethanol. This ethanolic mixture was boiled while periodically being stirred, for 20 minutes in a steam atmosphere so that a large number of small pieces of scrambled egg-like coagulated protein were produced and at the same time the fat and moisture contained in the raw material were digested in the ethanol. By this dehydration, water-soluble impurities in the egg are eliminated together with the moisture. The removal of the fat from the protein component is accelerated by the coagulating action. Especially, the heating with the use of alcoholic solvents such as ethanol or the like brings a remarkable effect, as contrasted with other hydrophilic defatting solvents, in easily extracting the fat contained in conjugated proteins such as lipoprotein and others. Thus the majority of the fat and moisture in the raw material is removed.

Then, the above-mentioned mixture is transferred to a cloth bag via a large size funnel carrying a receptacle below, and is filtered by squeezing the bag to obtain small pieces of coagulated protein. The coagulated protein remaining within the bag was put in a vessel and was combined with 2 l. of ethanol and treated in almost the same manner as mentioned above to further remove the fat and moisture. The defatted and dehydrated, coagulated, protein was transferred to a vessel in which was added 3 l. of a desalted water such as distilled water and cooked 25 minutes. During this period any coagulated protein pieces which formed into a large mass by the above-mentioned squeezing operation, were broken into a large number of small particles by stirring or kneading. By this operation, inorganic salts, carbohydrates such as glucose, mannose, or the like, and other impurities were extracted. This mixture was then placed in a cloth bag and was filtered by squeezing the bag to separately obtain the coagulated protein. A mass of these protein particles was again treated with a distilled water in the same manner as previously described and filtered. Next, the coagulated protein particle mass was transferred to a vessel and was combined with 1.5 l. of acetone and was stirred or kneaded. This operation is effective to cause the coagulated protein mass to be broken into pieces to fully effect the contact operation thereof with the acetone to remove water. The pieces were placed in a cloth bag and filtered by squeezing the bag to obtain the dehydrated coagulated protein. Again, the protein was treated in the same manner as above and filtered.

The removal of the water in the granular, coagulated, protein can also be carried out by a drying method such as air blowing or the like instead of the use of the dehydrating organic solvents such as acetone or the like. For instance, by blowing hot air of a temperature of 70° to 80° C. through the protein, the water is evaporated. A drying method such as this, however, requires a long time for water removal and converts the protein to a dried-out, bound state so that the subsequent defatting treatment becomes difficult. Furthermore, the degeneration of the remaining fat lowers the value of the product.

In the case when defatting organic solvents such as acetone are used, the dehydration can be accomplished in a short period of time and even after the dehydration, the coagulated substance can be maintained in a loose state so as to make the subsequent defatting efficiency effective.

In the case when the solvent is used, the solvent is then removed by filtration. The granular, coagulated, protein thus dehydrated is put in a vessel and is combined with 2 l. of ether and allowed to stand while being stirred at intervals. Thus, the remaining fat is extracted with ether. The resulting protein substance is filtered by a cloth bag to remove the ether. The coagulated substance in the bag is again treated with ether and is filtered in the same manner. The granular, purified, protein-coagulated substance thus obtained is subjected to air drying to remove the smell of ether therefrom and then dried by heating at 105° C.

There is thus obtained, white, granular, purified, whole egg protein.

In the above-mentioned operations, the remaining fat removal treatment with ether may be effected prior to the treatments with hot water and acetone.

In this case, however, the coagulated substance includes the remaining moisture which is large in volume in comparison with the substance which has received the treatments with hot water and acetone, and this makes the defatting operation difficult, so that it is preferable that the defatting operation be effected after the treatments with hot water and acetone.

The product is obtained in granular form but the same may be crushed into powder, depending on the purposes of use, by any known powdering machine. As a result, the yield is 10%, in weight, of the raw material. The nitrogen content is 14% and the moisture content is 9.16%. The protein content is 98.5% provided that the nitrogen factor of protein is 6.38, and there is obtained a whole egg protein product of high purity. In general, the recovery rate of the protein from the raw material egg is 92 to 96%. Not only can almost all of the raw material protein be obtained as a purified protein, but also the product may be of the same amino acid composition as the raw material egg so that the nutritive value is very high.

In the case when the product of the invention is used as a protein source for the feed for animals, its biological value is 99.8±1.4 (100 being the highest value) and the amino acid composition thereof is uniform, so that the product may be considered as a superior standard reference protein dietary source which can be substituted for feeds which do not reach 100 in biological value and are not uniform in quality.

In the conventional method, the raw egg material is subjected to a defatting treatment after being dehydrated and dried, so that the fat contained in the egg before defatting is adhered to the protein and a part thereof is degenerated so that the extraction of fat, coloring matter and other impurities with a defatting solvent becomes difficult and the value of the product is lowered due to the coloring or the like. According to the invention, however, the raw material egg is first subjected, in raw state, to the hydrophilic defatting solvent, so that the majority of the fat and moisture contained therein and also the concomitant impurities existing therewith can be removed whereby the subsequent purifying efficiency is raised. In addition, since the mixture of the egg and the solvent is heated and scrambled so that the coagulated protein may be produced in the form of small pieces, the contacting area of the coagulated protein with the solvent becomes large to make the defatting and dehydrating effect remarkably efficient and rapid and at the same time the coagulated substance can be subjected to the subsequent purification treatments in the form of small pieces so that the purifying operation efficiency is raised. The removal treatment of the remaining inorganic salts, carbohydrates and fat is then carried out, so that a white, high purity product is obtained, and since the purified protein substance is dried in granular form, the drying is very efficient, and the dried product can be preserved for a long time and easily handled and is ideal as a standard reference protein source of foods for experimental animals. The product can be used generally as a protein source in foods, feeds, or medicines and the like.

What is claimed is:

1. A process for the manufacture of purified whole egg protein, said process comprising mixing raw material egg with a hydrophilic defatting solvent selected from the group consisting of ethanol, methanol and acetone, heating the resultant mixture to boiling, while stirring, so as to extract from the raw material the majority of its moisture and fat and at the same time to form particles of coagulated whole egg protein, filtering the coagulated protein particles, contacting the coagulated protein particles with hot water to remove carbohydrates and inorganic salts therefrom, removing the water from the protein particles, then removing any remaining fat from the protein particles by contact with an organic defatting solvent, and thereafter drying the protein particles to form a granular product.

2. A process according to claim 1, wherein the defatting solvent which is mixed with the raw material egg is ethanol.

3. A process according to claim 1, wherein the water is removed from the protein particles by treatment with an organic dehydrating solvent.

4. A process according to claim 3, wherein said organic dehydrating solvent is acetone.

5. A process according to claim 1, wherein the water is removed from the protein particles by a drying treatment.

6. A process according to claim 5, wherein the drying treatment is effected by the passage of hot air at a temperature of between 70° C. and 80° C.

7. A process according to claim 1, wherein the organic defatting solvent for the removal of the remaining fat is ether.

8. A process according to claim 1, comprising crushing the granular product to form a powder.

9. A process according to claim 1, comprising exposing the mixture of raw material egg and hydrophilic defatting solvent to steam while it is being heated and stirred.

References Cited
UNITED STATES PATENTS

| | | | |
|---|---|---|---|
| 1,144,829 | 6/1915 | Fendler | 260—122 |
| 2,243,860 | 6/1941 | Freilich et al. | 260—112 X |
| 2,377,961 | 6/1945 | Pollak | 260—122 |
| 2,451,116 | 10/1948 | Pollak | 260—122 |
| 2,454,915 | 11/1948 | Fevold et al. | 260—112 |
| 2,492,518 | 12/1949 | Block et al. | 260—112 |
| 1,277,727 | 9/1918 | Hussey | 99—113 |

OTHER REFERENCES

Journal of the American Chemical Society, 71, 1949, pp. 3670–3679, Mecham et al.

Biochemistry, p. 557, Fruton et al., 1958

HOWARD E. SCHAIN, Primary Examiner

U.S. Cl. X.R.

99—2N, 14, 18